(12) United States Patent
Lu

(10) Patent No.: US 10,051,279 B2
(45) Date of Patent: Aug. 14, 2018

(54) HIGH QUALITY DISPLAY SYSTEM COMBINING COMPRESSED FRAME BUFFER AND TEMPORAL COMPENSATION TECHNIQUE

(71) Applicant: SAMSUNG DISPLAY CO., LTD., Yongin, Gyeonggi-Do (KR)

(72) Inventor: Ning Lu, Saratoga, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 297 days.

(21) Appl. No.: 14/740,162

(22) Filed: Jun. 15, 2015

(65) Prior Publication Data
US 2016/0007049 A1 Jan. 7, 2016

Related U.S. Application Data

(60) Provisional application No. 62/019,834, filed on Jul. 1, 2014.

(51) Int. Cl.
*H04N 19/426* (2014.01)

(52) U.S. Cl.
CPC .................. *H04N 19/428* (2014.11)

(58) Field of Classification Search
CPC .. H04N 19/428; H04N 19/587; H04N 19/463; H04N 19/895
See application file for complete search history.

(56) References Cited

U.S. PATENT DOCUMENTS 5,982,433 A * 11/1999 Kim .................... H04N 19/593
375/240.01
6,356,361 B1 * 3/2002 Ishikawa et al. .... H04N 1/4052
358/1.9
7,158,140 B1 * 1/2007 Klebanov ............. G06F 3/1438
345/502
2005/0053287 A1 * 3/2005 So .......................... H04N 19/50
382/232
2005/0162704 A1 * 7/2005 He ......................... H04N 1/405
358/3.06
2006/0176303 A1 * 8/2006 Fairclough ............. G06T 15/50
345/426
2008/0152002 A1 * 6/2008 Hague .................... H04N 19/61
375/240.12

(Continued)

FOREIGN PATENT DOCUMENTS

| JP | 4454380 | 2/2010 |
| JP | 5285683 | 6/2013 |
| KR | 10-2011-0041281 A | 4/2011 |

OTHER PUBLICATIONS

Espace Biblio Abstract JP 2912119950(A) dated Jun. 21, 2012 which corresponds to JP Registration Patent No. 5,285,683 dated Jun. 21, 2012 as shown above.

*Primary Examiner* — Jay Patel
*Assistant Examiner* — Marnie Matt
(74) *Attorney, Agent, or Firm* — Lewis Roca Rothgerber Christie LLP

(57) ABSTRACT

A system for compressing video images while maintaining quality. A codec is used to encode and decode (i.e., compress and decompress) an image in a sequence of images, and the decoded image is used to calculate an error image, which is added to a subsequent image before it is encoded. The compressed image is transmitted to a display device, in which it is decoded and displayed.

19 Claims, 3 Drawing Sheets

(56) References Cited

U.S. PATENT DOCUMENTS

| | | | |
|---|---|---|---|
| 2008/0198270 A1* | 8/2008 | Hobbs | H04N 19/44 348/708 |
| 2008/0235010 A1* | 9/2008 | Takahashi | G10L 21/01 704/224 |
| 2009/0128693 A1* | 5/2009 | Owaki | G09G 3/2066 348/441 |
| 2010/0027679 A1* | 2/2010 | Sunahara | H04N 21/2381 375/240.24 |
| 2012/0027083 A1* | 2/2012 | Narroschke | H04N 19/70 375/240.03 |
| 2013/0251277 A1 | 9/2013 | Yamaguchi et al. | |
| 2014/0219343 A1* | 8/2014 | Park | H04N 19/00575 375/240.12 |
| 2016/0037172 A1* | 2/2016 | Shimizu | H04N 19/597 375/240.12 |

* cited by examiner

HIGH QUALITY DISPLAY SYSTEM COMBINING COMPRESSED FRAME BUFFER AND TEMPORAL COMPENSATION TECHNIQUE

CROSS-REFERENCE TO RELATED APPLICATION(S)

The present application claims priority to and the benefit of U.S. Provisional Application No. 62/019,834, filed Jul. 1, 2014, entitled "HIGH QUALITY DISPLAY SYSTEM COMBINING COMPRESSED FRAME BUFFER AND TEMPORAL COMPENSATION TECHNIQUE", the entire contents of which are incorporated herein by reference.

FIELD

One or more aspects of embodiments according to the present invention relate to video transmission, and more particularly to a system and method of transmitting encoded video while applying corrections to improve the quality of the decoded video.

BACKGROUND

As display technology advances and display resolution grows, e.g., from SD to HD, to 4K, and to 8K, the amount of static random access memory (SRAM) which may be used for frame buffering in a display may increase, and the cost of manufacturing displays may increase accordingly. Compressing the data stored in a frame buffer may reduce memory requirements and cost, but some compression algorithms may result in degraded image quality. Thus, there is a need for a system and method for compressing image data that preserves acceptable image quality.

SUMMARY

Aspects of embodiments of the present disclosure are directed toward a system for compressing video images while maintaining quality. A codec is used to encode and decode (i.e., compress and decompress) an image in a sequence of images, and the decoded image is used to calculate an error image, which is added to a subsequent image before it is encoded. The compressed image is transmitted to a display device, in which it is decoded and displayed.

According to an embodiment of the present invention there is provided a method for transmitting a sequence of images, the method including: adding, by a first processor, the product of: a weight; and a first error image to a first input image of the sequence of images to form a first adjusted image; encoding, by the first processor, the first adjusted image to form a first encoded image; decoding, by the first processor, the first encoded image to form a first output image; and subtracting, by the first processor, the first output image from the first adjusted image to form a second error image.

In one embodiment, the value of the weight is 1.
In one embodiment, the value of the weight is less than 1.
In one embodiment, the first encoded image occupies an amount of memory that is at most ¼ an amount of memory occupied by the first adjusted image.
In one embodiment, the method includes: transmitting, by the first processor, the first encoded image to a memory connected to a second processor, and decoding, by the second processor, the first encoded image to form the first output image.

In one embodiment, the value of the weight is 1.
In one embodiment, the value of the weight is less than 1.
In one embodiment, the method includes displaying the first output image on a display.
In one embodiment, the display is configured to operate at a frame rate of at least 120 frames per second.
In one embodiment, the application includes the application of the method to each of a sequence of input images, the first error image utilized for each input image after the first input image being the second error image formed for the preceding input image, wherein an overall temporal average error decreases inversely with the number of input images in the sequence.
In one embodiment, the method includes selecting a value for the weight based on an extent to which one input image of the sequence of input images differs from a subsequent input image of the sequence of input images.

According to an embodiment of the present invention there is provided a system for transmitting video data including a sequence of images, the system including: a first processor; a first memory; the first memory storing a sequence of instructions that when executed by the first processor, cause the first processor to: add a first error image to a first input image of the sequence of images to form a first adjusted image; encode the first adjusted image to form a first encoded image; decode the first encoded image to form a first output image; and subtract the first output image from the first adjusted image to form a second error image.

In one embodiment, the system includes: a second processor; and a second memory, the first memory further storing a sequence of instructions that when executed by the first processor, cause the first processor to: transmit the first encoded image to the second memory, the second memory storing a sequence of instructions that, when executed by the second processor, cause the second processor to: also decode the first encoded image.

In one embodiment, the first encoded image occupies an amount of memory that is at most ¼ an amount of memory occupied by the first adjusted image.
In one embodiment, the second processor and the second memory are components of a display.
In one embodiment, the first processor and the first memory are components of a video adapter.
In one embodiment, the display is configured to operate at a frame rate of 120 frames per second or more.

According to an embodiment of the present invention there is provided a system for transmitting video data including a sequence of input images, the system including: means for processing the input images of the sequence of input images to form a sequence of encoded images; means for decoding the encoded images of the sequence of encoded images to form a sequence of decoded images; and means for applying temporal compensation to the processing of the input images.

In one embodiment, the means for processing the input images includes: means for adding the product of: a weight; and a first error image to a first input image of the sequence of images to form a first adjusted image; and means for encoding the first adjusted image to form a first encoded image; means for decoding the first encoded image to form a first output image; and means for subtracting the first output image from the first adjusted image to form a second error image.

In one embodiment, the system includes: means for transmitting an encoded image of the sequence of encoded images to a display; and means for decoding the encoded image, in the display.

BRIEF DESCRIPTION OF THE DRAWINGS

These and other features and advantages of the present invention will be appreciated and understood with reference to the specification, claims and appended drawings wherein:

DETAILED DESCRIPTION

The detailed description set forth below in connection with the appended drawings is intended as a description of exemplary embodiments of a high quality display system combining a compressed frame buffer and a temporal compensation technique provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Video data for display on, e.g., a computer display panel, may be generated by a video adapter 313 in a computer 310 (FIG. 3), and transmitted to a display over a video data interface, which may be a standardized data link such as High-Definition Multimedia Interface (HDMI), or Digital Visual Interface (DVI). The display may contain two SRAM data buffers (or "frame buffers") arranged in a double-buffer configuration, in which at any time one buffer (the current write buffer) is updated with new data received from the video adapter 313 while the other buffer (the current read buffer) is being used to generate an image on the display panel. A component referred to as a timing controller in the display may perform some or all of these functions in the display. The timing controller may read the video data from the current read buffer, and send raw video data to one or more driver integrated circuits (ICs) which in turn may provide drive currents to the display panel to illuminate pixels in the display panel. The display may be an organic light emitting diode (OLED) display or a liquid crystal display (LCD).

Compression of the video data may be used to reduce the size and cost of the frame buffer memory. The video adapter 313 may for example encode the video data before transmitting it to the display, using an encoding scheme providing some amount of compression, and the timing controller may then decode the data as it is read out of the frame buffer. A high compression ratio, e.g., 4:1 or higher, may result in a greater cost savings (than e.g., a 2:1 compression ratio); the use of a high compression ratio coder-decoder (codec), however, may result not be visually lossless, i.e., it may result in perceptible changes, or a perceptible degradation in quality, in the displayed images.

Figure 1:
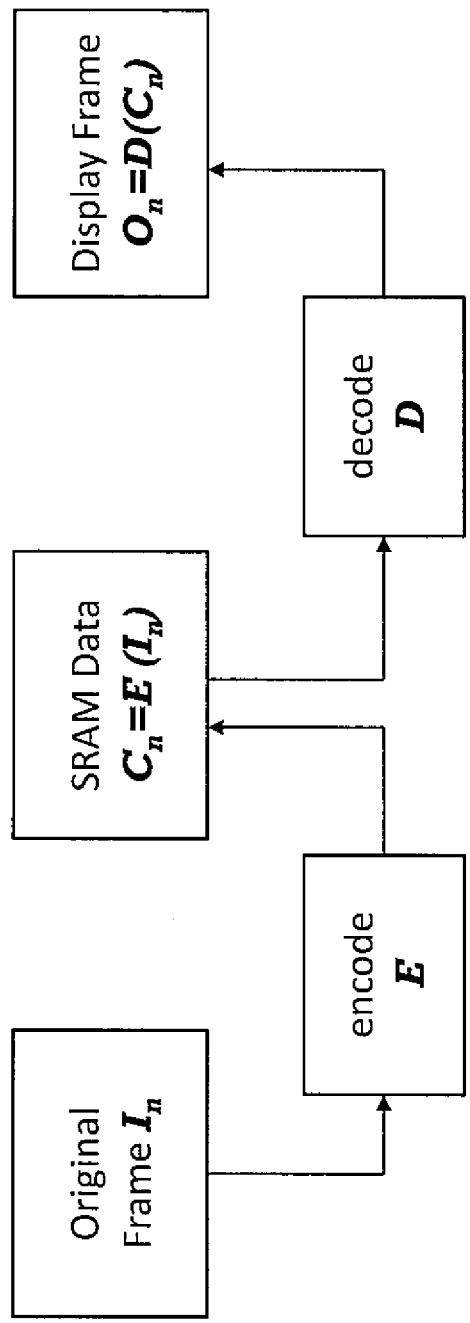
FIG. 1 is a block diagram of a related art encoding-decoding system.

In one embodiment, a system and method of temporal correction is used to improve the visual quality of a sequence of frames (or "images") sent to, and displayed on, a display. As used herein, temporal correction refers to the use of cross-frame correction, i.e., the use of measured coding-decoding error (or, equivalently, compression-decompression error) in one frame of a sequence of frames to reduce the error in another frame of the sequence of frames. Referring to FIG. 1, in a related-art embodiment, an original "input" image (or "frame") $I_n$ (generated, for example, by the video adapter 313), is encoded, stored in an SRAM frame buffer as an encoded frame $C_n = E(I_n)$ where E( ) is the encoding (i.e., compression) function, then decoded and displayed as "output" frame $O_n = D(C_n)$ where D( ) is the decoding (i.e., decompression) function. If the codec is not visually lossless, then the output frame $O_n$ may have perceptible defects.

Figure 2:
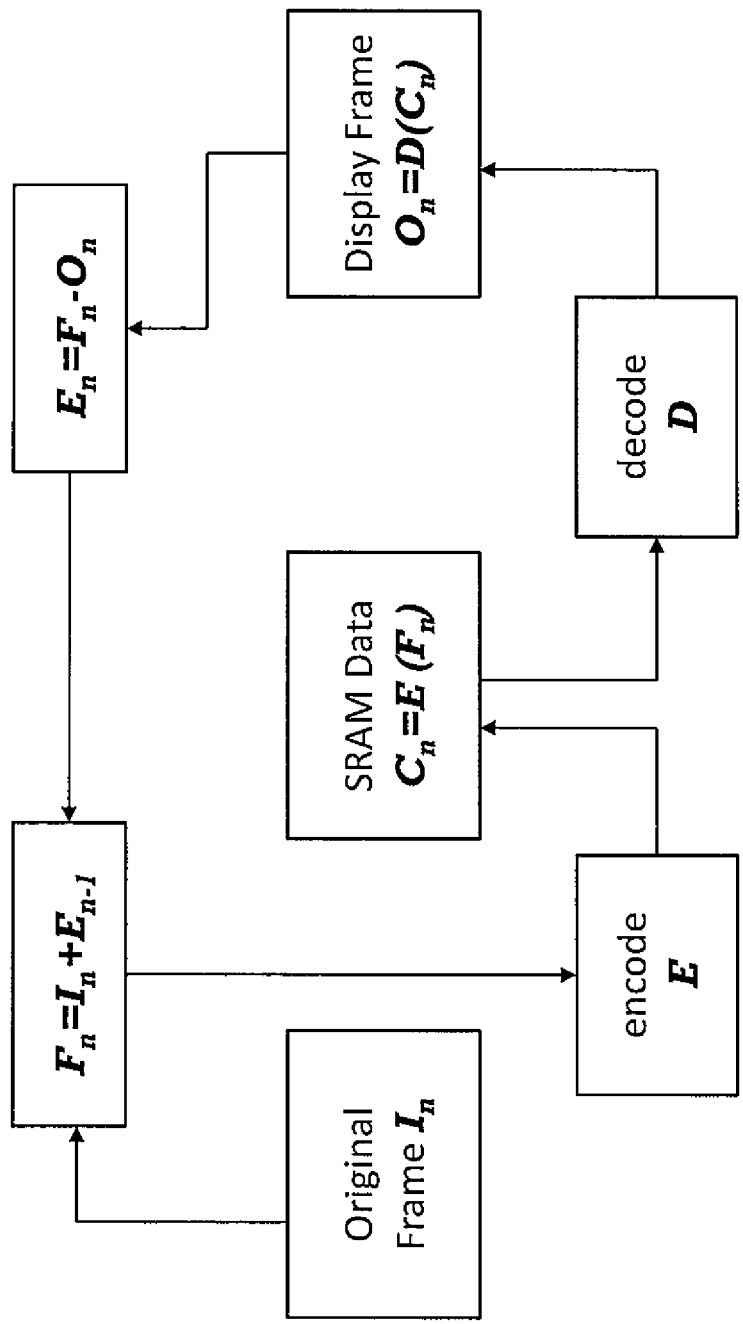
FIG. 2 is a block diagram of an encoding and decoding system with temporal compensation according to an embodiment of the present invention.

Referring to FIG. 2, in one embodiment, temporal correction is used to reduce visual discrepancies between input frames and output frames. To each original frame or "input" image $I_n$ (of a sequence of input images), an error image from the preceding frame $E_{n-1}$ is added, to form an adjusted image $F_n = I_n + E_{n-1}$. The adjusted image is encoded to form an encoded image $C_n = E(F_n)$. In one embodiment the encoding compresses the image by a factor of at least 4, i.e., each encoded image occupies an amount of memory that is at most ¼ an amount of memory occupied by the corresponding adjusted image. In one embodiment, a codec selected from any of a group of codecs proposed to the Video Electronics Standards Association (VESA) as display frame buffer compression, either 2-to-1 or 4-to-1, is used. The encoded image $C_n$ is then decoded to form an output image $O_n = D(C_n)$, and a new error image $E_n$ (to be used with the next input image) is formed: $E_n = F_n - O_n$. As used herein, an "error image" is an image formed as the difference between two images, each of the two images representing or approximately representing, the same display image. Thus, for example, an error image may be an array of zeros if the two images are identical (no error), and it may be an array of small numbers if the two images differ little.

In a simplified illustrative example, a hypothetical codec may have an encoding function that adds 2 to each input pixel value and then divides by 4 (discarding any fractional part), and a decoding function that multiplies by four. Thus, the combination of encoding and decoding has the effect that input values of 0 or 1 are mapped to output values of 0, and input values of 2, 3 or 4 are mapped to 4. For large (e.g., 16-bit) pixel values such a codec provides limited compression, but it illustrates the operation of an embodiment. When the system starts up, e.g., with n=1, no error image is available from a previous frame, so a value of zero is used. If the pixel value of a pixel of the input image ($I_n$) is constant, with a value of 3, then the first adjusted image ($F_1$) has a pixel value of 3, the first output image ($O_1$) has a pixel value of 4, and the first error image ($E_1$) has a pixel value of −1. The second adjusted image ($F_2$) has a pixel value of 3−1=2, the second output image ($O_2$) has a pixel value of 4, and the second error image ($E_2$) has a pixel value of −2. The third adjusted image ($F_3$) has a pixel value of 3−2=1, the third output image ($O_3$) has a pixel value of 0, and the third error image has a pixel value of +1. The fourth adjusted image ($F_4$) has a pixel value of 3+1=4, the fourth output image has a pixel value of 4, and the fourth error image has a pixel value of 0. The fourth error image thus has the same pixel value as the initial value, and the process then repeats, with three frames of the output image having a pixel value of 4, and a fourth frame having a pixel value of 0. Table 1 below shows the sequence of operation for two cycles.

TABLE 1

Pixel values for embodiment with hypothetical codec

| n | $I_n$ | $F_n$ | $O_n$ | $E_n$ |
|---|---|---|---|---|
| 1 | 3 | 3 | 4 | −1 |
| 2 | 3 | 2 | 4 | −2 |
| 3 | 3 | 1 | 0 | 1 |
| 4 | 3 | 4 | 4 | 0 |
| 5 | 3 | 3 | 4 | −1 |
| 6 | 3 | 2 | 4 | −2 |
| 7 | 3 | 1 | 0 | 1 |
| 8 | 3 | 4 | 4 | 0 |

The visual effect perceived the viewer, of a pixel illuminated with a value of 4, three quarters of the time, and with a value of 0, one-quarter of the time, may be similar to that of seeing a pixel illuminated with a constant pixel value of 3. Thus, in one embodiment, the system compensates in one display frame for imperfections in the displayed image in previous or subsequent frames.

In one embodiment the pixel values in the output image may fluctuate, as in the example described above. This fluctuation may cause flickering for low display frame rates, and the flickering may be less perceptible or imperceptible for frame rates of 120 frames per second (fps) or 240 fps (e.g., when the output images are displayed by a display configured to operate at a frame rate of 120 frames per second or more). In one embodiment the overall temporal average error is given by $$\Sigma_{k<n} O_k - \Sigma_{k<n} I_k = E_n$$

and the accumulated average error is $E_n/n \approx 0$. The improvement in perceived image quality resulting from the use of embodiments of the present invention may be greatest for still images, or for images that vary little with time.

In one embodiment, the calculation of the adjusted image employs a weight a, so that the equation for the adjusted image is $F_n = I_n + \alpha E_{n-1}$, i.e., the adjusted image $F_n$ is formed by adding the product of the weight a and the previously formed error image $E_{n-1}$ to the input image $I_n$. When the value of α is 1, the calculation of the adjusted image is as described above; when the value of α is 0, there is no adjustment of the input image, and the codec operates directly on the input image. A value of α less than 1 may provide an improvement in the perceived quality of the images for a sequence of images that are changing significantly from frame to frame, or for certain frame rates. In one embodiment, the value of α to be used is selected by employing one or more test viewers to judge the perceived quality of sequences of images processed using various values of α.

Figure 3:
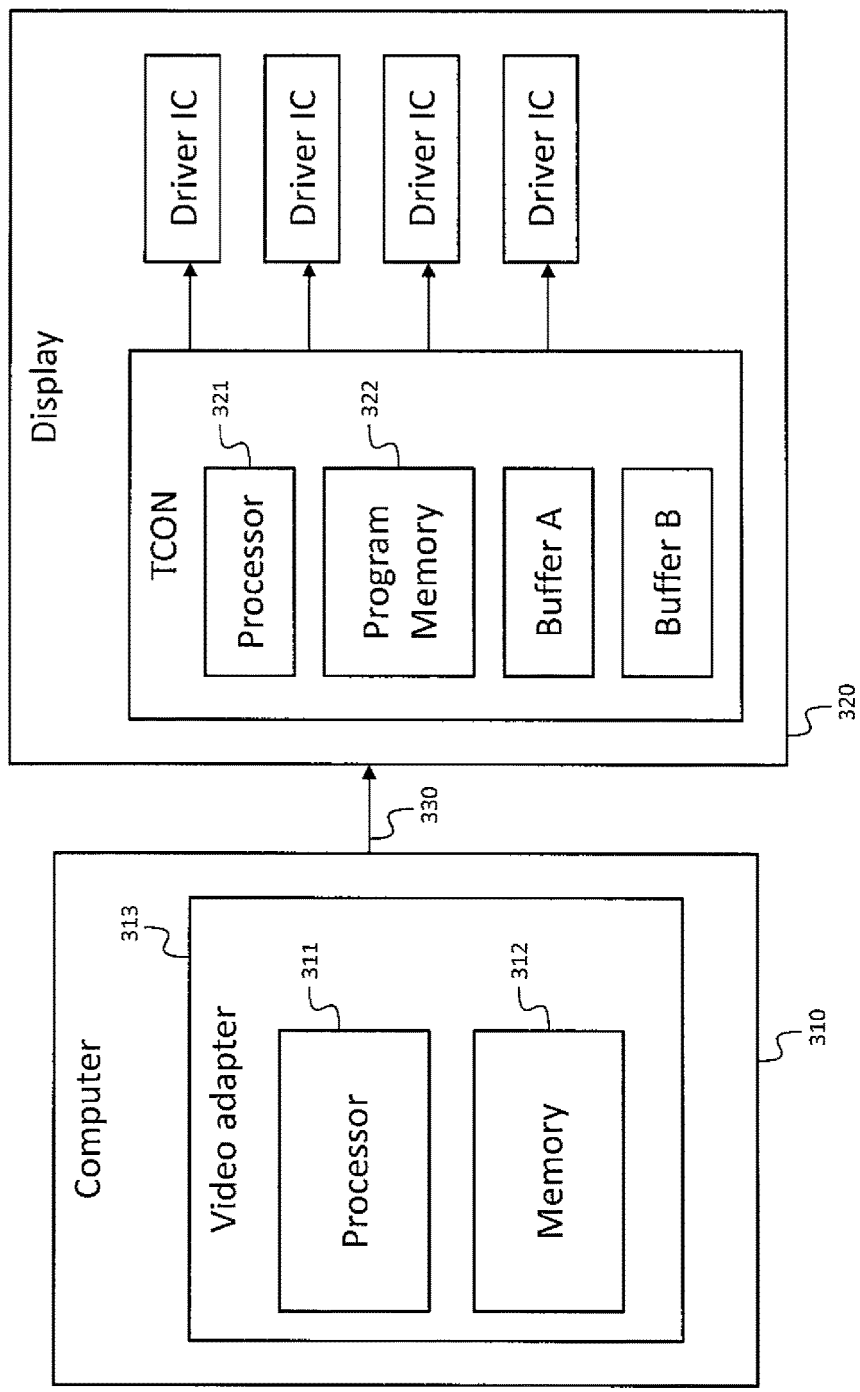
FIG. 3 is a block diagram of a computer in communication with a display according to an embodiment of the present invention.

Referring to FIG. 3, in one embodiment, a source of display data, such as a computer 310, includes a video adapter 313, such as a graphics card, which in turn includes a processor 311 and memory 312. The computer sends the video adapter 313 instructions for forming graphical images to be displayed; the video adapter 313 accordingly forms a sequence of images. This sequence of images is then the sequence of input images $I_n$. The video adapter 313 generates a sequence of frames (i.e., output images) and sends them to a display 320 over a video data interface 330, such as HDMI or DVI. To generate the sequence of output images, the video adapter 313 generates (or receives) each input image $I_n$, and forms an adjusted image $F_n$ from the input image by adding an error image $E_{n-1}$ from the preceding frame. The video adapter 313 encodes the adjusted image $F_n$ to form an encoded image $C_n = E(F_n)$. The video adapter 313 sends the encoded image $C_n$ to the display 320 through the video data interface 330. The video adapter 313 also decodes the encoded image $C_n$ to form an output image $O_n = D(C_n)$, and a new error image $E_n = F_n - O_n$ (to be used with the next input image).

The display 320 receives the sequence of encoded images $C_n$. In the display 320, each image $C_n$ is stored in one of the two frame buffers (buffer A or buffer B), depending on which is the current write buffer. The processor 321 in the timing controller (TCON), under the control of instructions stored in the program memory 322, decodes the contents of the current read buffer (either buffer A or buffer B), and sends the decoded image information (i.e., the output image $O_n = D(C_n)$), in the form of low-level pixel drive value commands, to the driver ICs. When an entire new frame has been written to the write buffer and the contents of the read buffer have been entirely read and decoded, read and write buffer pointers are interchanged, so that the recently-filled write buffer becomes the new read buffer and the recently decoded read buffer becomes the new write buffer. The frame buffers (buffer A and buffer B) may be implemented in SRAM memory, and, as a result of storing encoded (e.g., compressed) image data, the amount of SRAM memory required for these buffers may be reduced.

Specifically, referring to FIGS. 2 and 3, a system and method for transmitting a sequence of images (e.g., video data) may include a first processor 311 and a first memory 312, the first memory storing a sequence of instructions that when executed by the first processor 311, cause the first processor 311 to add a first error image $E_{n-1}$ to a first input image $I_n$ of the sequence of images to form a first adjusted image $F_n$; encode the first adjusted image $F_n$ to form a first encoded image $C_n$; decode the first encoded image $C_n$ to form a first output image $O_n$; and subtract the first output image $O_n$ from the first adjusted image $F_n$ to form a second error image $E_n$. In one embodiment, the system further includes a second processor 321, and a second memory 322, the first memory 312 further storing a sequence of instructions that when executed by the first processor 311, cause the first processor 311 to transmit the first encoded image $C_n$ to the second memory 322, the second memory 322 storing a sequence of instructions that, when executed by the second processor, cause the second processor to also decode the first encoded image. Thus, the second processor forms a sequence of decoded images. In one embodiment, the first encoded image occupies an amount of memory that is at most ¼ an amount of memory occupied by the first adjusted image. In one embodiment, the second processor 321 and the second memory 322 are components of a display 320. In one embodiment, the first processor 311 and the first memory 312 are components of a video adapter 313. In one embodiment, the display 320 is configured to operate at a frame rate of 120 frames per second or more.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration.

As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

It will be understood that, as used herein, a "processor" may include a plurality of elements each of which may be referred to as a processor. For example, a processor chip may include several cores, each of which may be referred to as a processor, or a processor may include multiple processors in a pipeline.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a high quality display system combining a compressed frame buffer and a temporal compensation technique have been specifically described and illustrated herein, many modifications and variations will be apparent to those skilled in the art. Accordingly, it is to be understood that the a high quality display system combining a compressed frame buffer and a temporal compensation technique constructed according to principles of this invention may be embodied other than as specifically described herein. The invention is also defined in the following claims, and equivalents thereof.

What is claimed is:

1. A method for transmitting a sequence of images to a display device, the method being implemented in a video adapter and in the display device, the video adapter comprising a first processor and the display device comprising a second processor, the method comprising:
    adding, by the first processor, the product of:
        a weight; and
        a first error image to a first input image of the sequence of images to form a first adjusted image, wherein the first error image is a result of an encode-decode error of an immediately previous image;
    encoding, by the first processor, the first adjusted image to form a first encoded image;
    storing, by the first processor, the first encoded image in a frame buffer, wherein a frame buffer size is reduced according to the encoding;
    decoding, by the first processor, the stored first encoded image to form a first output image; and
    subtracting, by the first processor, the first output image from the first adjusted image to form a second error image.

2. The method of claim 1, wherein the value of the weight is 1.

3. The method of claim 1, wherein the value of the weight is less than 1.

4. The method of claim 1, wherein the first encoded image occupies an amount of memory that is at most ¼ an amount of memory occupied by the first adjusted image.

5. The method of claim 1, further comprising:
    transmitting, by the first processor, the first encoded image to a memory connected to the second processor, and
    decoding, by the second processor, the first encoded image to form the first output image.

6. The method of claim 5, wherein the value of the weight is 1.

7. The method of claim 5, wherein the value of the weight is less than 1.

8. The method of claim 5, further comprising displaying the first output image on a display.

9. The method of claim 8, wherein the display is configured to operate at a frame rate of at least 120 frames per second.

10. A method, comprising the application of the method of claim 1 to each of a sequence of input images, the first error image utilized for each input image after the first input image being the second error image formed for the preceding input image, wherein an overall temporal average error decreases inversely with the number of input images in the sequence.

11. The method of claim 10, further comprising selecting a value for the weight based on an extent to which one input image of the sequence of input images differs from a subsequent input image of the sequence of input images.

12. A system for transmitting video data comprising a sequence of images, the system comprising:
 a first processor;
 a first memory;
 the first memory storing a sequence of instructions that when executed by the first processor, cause the first processor to:
  add a first error image to a first input image of the sequence of images to form a first adjusted image, wherein the first error image is a result of an encode-decode error of an immediately previous image;
  encode the first adjusted image to form a first encoded image;
  store the first encoded image in a frame buffer, wherein a frame buffer size is reduced according to the encoding;
  decode the stored first encoded image to form a first output image; and
  subtract the first output image from the first adjusted image to form a second error image.

13. The system of claim 12, further comprising:
 a second processor; and
 a second memory,
 the first memory further storing a sequence of instructions that when executed by the first processor, cause the first processor to:
 transmit the first encoded image to the second memory, and
 the second memory storing a sequence of instructions that, when executed by the second processor, cause the second processor to:
 decode the first encoded image.

14. The system of claim 13, wherein the first encoded image occupies an amount of memory that is at most ¼ an amount of memory occupied by the first adjusted image.

15. The system of claim 13, wherein the second processor and the second memory are components of a display.

16. The system of claim 15, wherein the first processor and the first memory are components of a video adapter.

17. The system of claim 15, wherein the display is configured to operate at a frame rate of 120 frames per second or more.

18. A system for transmitting video data comprising a sequence of input images, the system comprising:
 means for processing the input images of the sequence of input images to form a sequence of encoded images, the means for processing the input images comprising:
 means for adding the product of:
  a weight; and
  a first error image, wherein the first error image is a result of an encode-decode error of an immediately previous image;
 to a first input image of the sequence of images to form a first adjusted image; and
 means for encoding the first adjusted image to form a first encoded image;
 means for storing the first encoded image in a frame buffer, wherein a frame buffer size is reduced according to the encoding;
 means for decoding the stored first encoded image to form a first output image; and
 means for subtracting the first output image from the first adjusted image to form a second error image;
 means for decoding the encoded images of the sequence of encoded images to form a sequence of decoded images; and
 means for applying temporal compensation to the processing of the input images.

19. The system of claim 18, further comprising:
 means for transmitting an encoded image of the sequence of encoded images to a display; and
 means for decoding the encoded image, in the display.

* * * * *